(12) United States Patent
Viani

(10) Patent No.: US 7,360,284 B1
(45) Date of Patent: Apr. 22, 2008

(54) BUNGEE CORD SYSTEM

(76) Inventor: Arthur Viani, 12219 SW. 131 Ave., Miami, FL (US) 33186

( * ) Notice: Subject to any disclaimer, the term of this patent is extended or adjusted under 35 U.S.C. 154(b) by 0 days.

(21) Appl. No.: 11/465,880

(22) Filed: Aug. 21, 2006

(51) Int. Cl.
*B60P 7/06* (2006.01)
*F16G 11/14* (2006.01)

(52) U.S. Cl. ................ 24/302; 24/300; 24/600.6; 24/601.1

(58) Field of Classification Search ............ 24/300, 24/301, 302, 600.5, 600.6, 601.6
See application file for complete search history.

(56) References Cited

U.S. PATENT DOCUMENTS

| | | | | |
|---|---|---|---|---|
| 714,777 | A * | 12/1902 | Buck | 24/600.6 |
| 1,441,737 | A * | 1/1923 | Mickelson | 24/129 R |
| 2,216,499 | A * | 10/1940 | Ohotto | 24/600.6 |
| 3,328,064 | A * | 6/1967 | Simon | 292/288 |
| 5,638,584 | A * | 6/1997 | De Anfrasio | 24/265 H |
| 5,937,491 | A * | 8/1999 | Chih | 24/700 |
| 6,868,586 | B1 * | 3/2005 | Hall | 24/115 A |
| 7,093,329 | B1 * | 8/2006 | Chiu | 24/301 |

* cited by examiner

*Primary Examiner*—Robert J. Sandy
(74) *Attorney, Agent, or Firm*—Albert Bordas, P.A.

(57) ABSTRACT

A bungee cord system, including, a bungee cord assembly, engaging locks, and universal anchors to safely secure, store, transport, and/or stack packages, containers and the like to surfaces. The bungee cord assembly includes an elasticized cord with first and second ends. An engaging lock assembly is fixed upon each of said first and second ends. The universal anchor includes at least one elongated member having anchor means that removably attach to the bungee cord assembly and/or the engaging lock assembly and/or a solid structure.

1 Claim, 3 Drawing Sheets

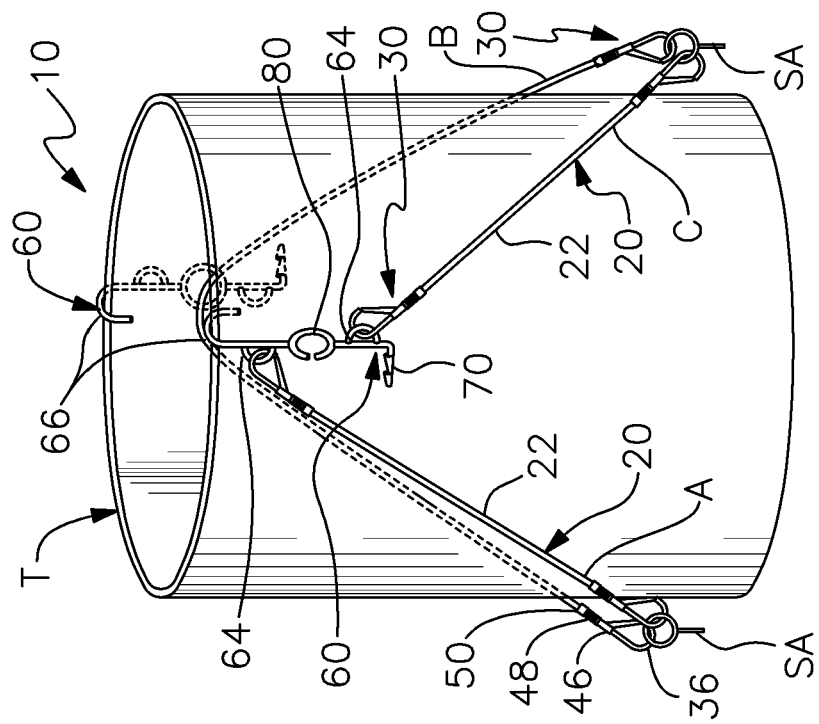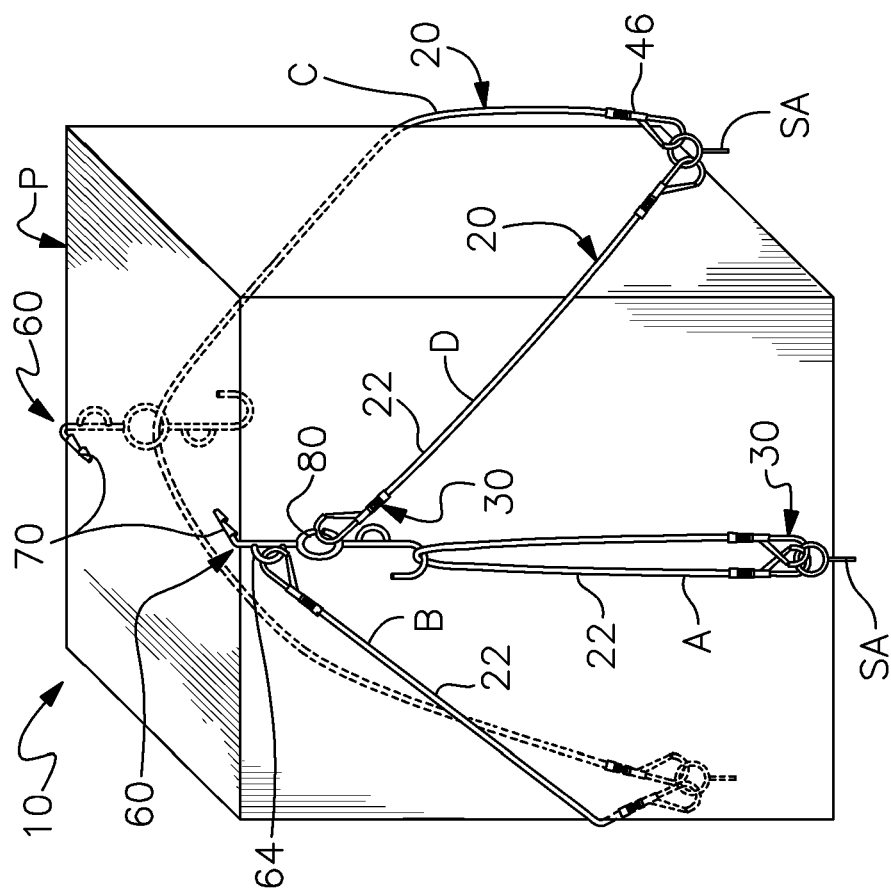

US 7,360,284 B1

BUNGEE CORD SYSTEM

BACKGROUND OF THE INVENTION

1. Field of the Invention

The present invention relates to elasticized rope systems, and more particularly, to a bungee cord system having universal anchors for securing, storing, transporting, and/or stacking packages, containers and the like.

2. Description of the Related Art

Packages and containers are often secured to surfaces for a variety of reasons, and especially during transportation. This is often the case when packages and/or containers are transported in vehicles such as a pick-up truck as an example. When not secured, packages and/or containers shift and slide across the surface they are placed upon, thus presenting hazardous situations. There is a need of bungee cords having engaging locks and universal anchors to safely secure, store, transport, and/or stack packages, containers and the like to surfaces. There is also a need of bungee cords having engaging locks and universal anchors to secure, store, transport, and/or stack packages, containers and the like to surfaces in the event of weather conditions such as, but not limited to wind gusts and storms.

A bungee cord is defined as an elasticized rubber cord, often fitted with hooks at the ends, used to fasten, bear weight, or absorb shock. Several bungee cords have been developed in the past. Applicant, however, is not aware of any bungee cords having engaging locks and universal anchors to safely secure, store, transport, and/or stack packages, containers and the like to surfaces.

SUMMARY OF THE INVENTION

A bungee cord system, comprising a bungee cord assembly having an elasticized cord with first and second ends; and an engaging lock assembly at each of the first and second ends. The engaging lock assembly comprises an elongated shaft having a hook and terminating at a distal end. Extending from the elongated shaft at a predetermined angle is an engaging arm. The engaging lock assembly further comprises a sleeve member that journals the elongated shaft and a housing having a base. The housing houses a spring member. The spring member has a spring force to bias the engaging arm against the distal end. Engaging means include placing an external force upon the sleeve member to overcome the spring force, to temporarily create a predetermined distance between the engaging arm and the distal end.

The bungee cord system also includes a universal anchor. The universal anchor comprises at least one elongated member having anchor means that removably attach to the bungee cord assembly and/or the engaging lock assembly and/or a solid structure. The solid structure is a housing to contain matter. The housing contains matter is a package, container, or tank.

The anchor means may comprise at least one hook anchor, and/or at least one semi-circular anchor, and/or at least one anchor having incremental notched walls, and/or at least one circular anchor.

It is therefore one of the main objects of the present invention to provide a bungee cord system having engaging locks and universal anchors to safely secure, store, transport, and/or stack packages, containers and the like to surfaces.

It is another object of the present invention to provide a bungee cord system having engaging locks and universal anchors that can be readily fixed into various positions and multiple configurations.

It is another object of the present invention to provide a bungee cord system having engaging locks and universal anchors that does not require the use of tools for installation.

It is yet object of the present invention to provide a bungee cord system having engaging locks and universal anchors that is secure but does not increase storage or transportation logistics.

It is yet object of the present invention to provide a bungee cord system having engaging locks and universal anchors that is durable.

It is still another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates an isometric view of the present invention used with a substantially square package.

FIG. 4 is an isometric view of the present invention used with a substantially cylindrical container.

DETAILED DESCRIPTION OF THE PREFERRED EMBODIMENT

Figure 1:
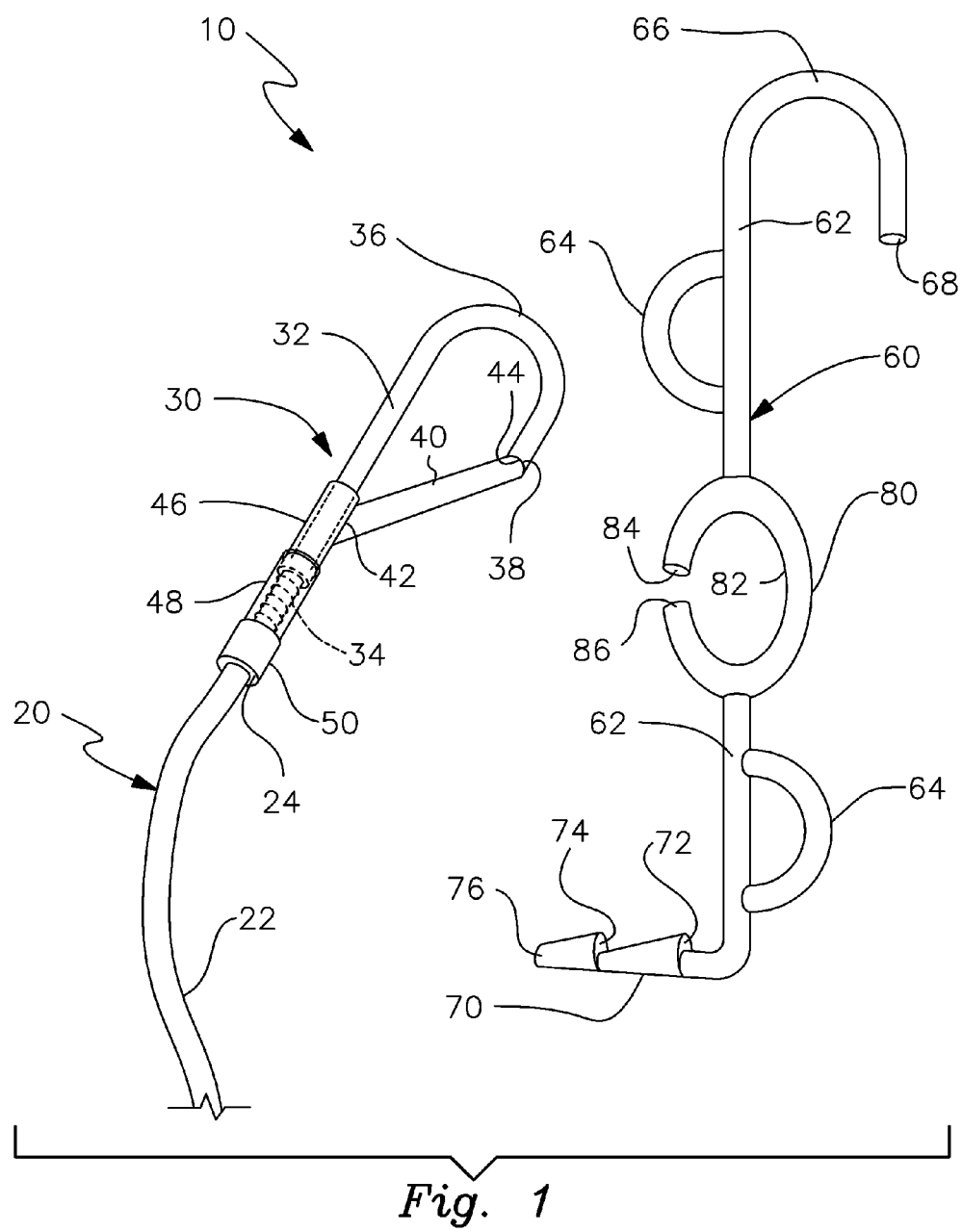
FIG. 1 represents a perspective view of the present invention.

Referring now to the drawings, where the bungee cord system is generally referred to with numeral 10, it can be observed that it basically includes bungee cord assembly 20, engaging lock assembly 30, and universal anchor 60.

Figure 2:
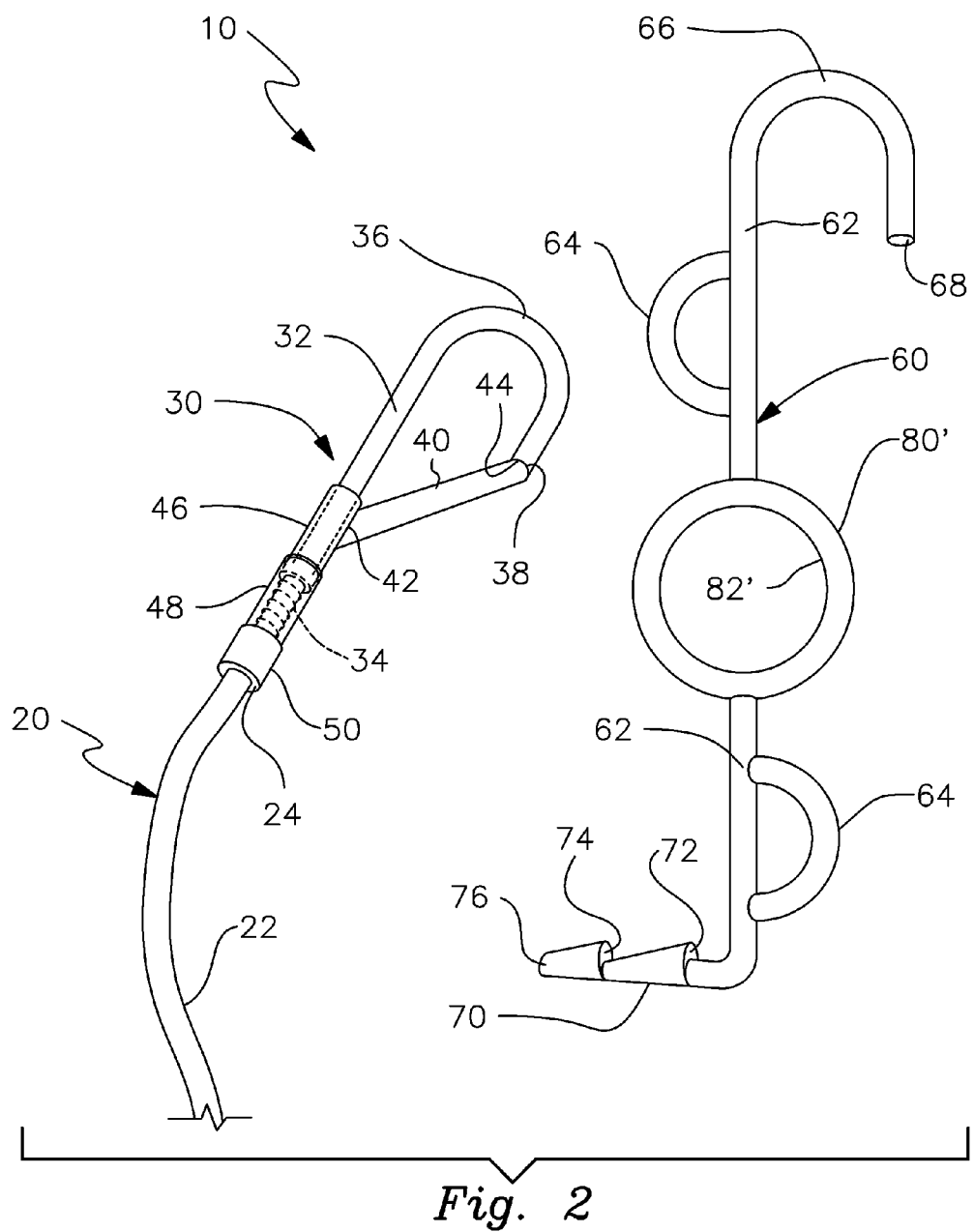
FIG. 2 shows a perspective view of an alternate embodiment of the universal anchor.

As seen in FIGS. 1 and 2, bungee cord assembly 20 comprises cord 22 and end 24. In the preferred embodiment, cord 22 is an elasticized cord. Fixedly secured to end 24 is engaging lock assembly 30. Engaging lock assembly 30 comprises elongated shaft 32 having curvature, defined as hook 36 that terminates at end 38. Slidably mounted onto elongated shaft 32 is sliding sleeve member 46 having a housing 48 and base 50. Housed with housing 48 is spring member 34. Extending from elongated shaft 32, at a predetermined angle, is engaging arm 40 having ends 42 and 44. Engaging arm 40 is aligned so that end 44 is biased against and abuts end 38 with a spring force from spring member 34. Engaging means defines a temporary external force may be applied upon sliding sleeve member 46 in the general direction of base 50, to overcome the spring force of spring member 34 and create space between ends 38 and 44.

In the preferred embodiment, universal anchor 60 comprises anchor means that include two elongated members 62, extending in opposite directions from each other from member 80. Member 80 is in the general shape of the letter "C" and comprises inside wall 82 and has ends 84 and 86. In a first direction, elongated member 62 has semi-circle lock 64 and curvature defined as hook 66 that terminates at end 68. In a second direction, elongated member 62 has its own semi-circle lock 64, facing opposite in direction, and has anchor 70 comprising incremental notched walls 72 and 74, and terminating at end 76. The universal anchor 60 has the anchor means to removably attach universal anchor 60 to bungee cord assembly 20 and/or engaging lock assembly 30 and/or a solid structure. A solid structure may be a ladder, or even a housing to contain matter. As an example, the housing to contain matter may be a package, container, or tank.

As seen in FIG. 2, in an alternate embodiment, universal anchor 60 comprises member 80' that is in the general shape of the letter "O" and comprises inside wall 82'.

As shown in FIGS. 3 and 4, each bungee cord system 10 has a bungee cord assembly 20, an engaging lock assembly 30, and a universal anchor 60 to readily secure, store, transport, and/or stack packages, containers and the like, in multiple configurations without using tools. As best seen in FIG. 3, a plurality of bungee cord systems 10 are fixed onto package P for securing, storing, transporting, and/or stacking purposes. Typically, each bungee cord assembly 20 will comprise one cord 22 having two ends 24, and fixedly secured to each end 24 is an engaging lock assembly 30. There are a variety of configurations in which the instant invention 10 may be utilized to secure package P. In this illustration, we identify a plurality of instant inventions 10 as "A"; "B"; "C"; and "D".

In FIG. 3, "A" defines a bungee cord assembly 20 looped over hook 66 of a universal anchor 60 and both engaging lock assemblies 30 fixed upon a single surface anchor SA.

In FIG. 3, "B" defines a bungee cord assembly 20 having a first engaging lock assembly 30 fixed upon a surface anchor SA and a second engaging lock assembly 30 fixed upon a semi-circle lock of universal anchor 60.

In FIG. 3, "C" defines a bungee cord assembly 20 having a first engaging lock assembly 30 fixed upon one surface anchor SA, having passed through member 80 of a universal anchor 60, and having a second engaging lock assembly 30 fixed upon a second surface anchor SA.

In FIG. 3, "D" defines a bungee cord assembly 20 having a first engaging lock assembly 30 fixed upon a surface anchor SA and a second engaging lock assembly 30 fixed upon a member 80' of a universal anchor 60.

As seen in this illustration, walls 72 and 74 of anchors 70 are biased against the top wall of package P and grip thereon.

As best seen in FIG. 4, a plurality of bungee cord systems 10 are fixed onto tank T for securing, storing, transporting, and/or stacking purposes.

Typically, each bungee cord assembly 20 will comprise one cord 22 having two ends 24, and fixedly secured to each end 24 is an engaging lock assembly 30. There are a variety of configurations in which the instant invention 10 may be utilized to secure tank T. In this illustration, we identify a plurality of instant inventions 10 as "A"; "B"; and "C".

In FIG. 4, "A" and "C" define bungee cord assemblies 20 having first engaging lock assemblies 30 fixed upon surface anchors SA and second engaging lock assemblies 30 fixed upon the semi-circle locks 64 of a universal anchor 60.

In FIG. 4, "B" defines bungee cord assembly 20 having a first engaging lock assembly 30 fixed upon one surface anchor SA, having passed through member 80 of a universal anchor 60, and has a second engaging lock assembly 30 fixed upon a second surface anchor SA.

As seen in this illustration, hooks 66 of universal anchors 60, hook over a rim of tank T and are biased thereon.

At least one bungee cord system 10 fixed onto packages, tanks, and/or containers emit forces to effectively stabilize them for securing, storing, transporting, and/or stacking purposes. A greater number or lesser number of bungee cord systems 10 may also be utilized to effectively emit forces thereon to effectively stabilize for securing, storing, transporting, and/or stacking purposes.

In other embodiments, surface anchors SA may be fixed upon surfaces of vehicles, such as but not limited to, pick-up truck flatbeds and trailers; cargo compartments in aircrafts, trains, and marine vessels.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bungee cord system, comprising:
A) a bungee cord assembly comprising an elasticized cord with first and second ends;
B) an engaging lock assembly at each of said first and second ends, said engaging lock assembly comprises an elongated shaft having a hook and terminating at a distal end, extending from said elongated shaft at a predetermined angle is an engaging arm, said engaging lock assembly further comprises a sleeve member that journals said elongated shaft, said sleeve member comprises a housing having a base, said housing houses a spring member, said spring member has a spring force to bias said engaging arm against said distal end;
C) engaging means that include placing an external force upon said sleeve member to overcome said spring force to temporarily create a predetermined distance between said engaging arm and said distal end; and
D) a universal anchor, said universal anchor comprising at least one elongated member having anchor means that removably attach to said bungee cord assembly or said engaging lock assembly or a solid structure, said solid structure is a housing to contain matter, said housing to contain matter is a package, container, or tank, said anchor means comprises at least one hook anchor and at least one semi-circular anchor and at least one anchor having incremental notched walls approximately parallel to said at least one elongated member, and said anchor means also comprises at least one circular anchor.

* * * * *